US011868399B2

(12) United States Patent
Aher et al.

(10) Patent No.: US 11,868,399 B2
(45) Date of Patent: Jan. 9, 2024

(54) SYSTEM AND METHODS FOR RESOLVING QUERY RELATED TO CONTENT

(71) Applicant: Rovi Guides, Inc., San Jose, CA (US)

(72) Inventors: Ankur Anil Aher, Maharashtra (IN); Jeffry Copps Robert Jose, Tamil Nadu (IN)

(73) Assignee: Rovi Guides, Inc., San Jose, CA (US)

( * ) Notice: Subject to any disclaimer, the term of this patent is extended or adjusted under 35 U.S.C. 154(b) by 384 days.

(21) Appl. No.: 17/345,217

(22) Filed: Jun. 11, 2021

(65) Prior Publication Data
US 2022/0398279 A1 Dec. 15, 2022

(51) Int. Cl.
G06F 16/783 (2019.01)
G06F 3/0482 (2013.01)
G06F 16/78 (2019.01)
G06F 16/732 (2019.01)
G06F 16/75 (2019.01)

(52) U.S. Cl.
CPC ........ *G06F 16/7837* (2019.01); *G06F 3/0482* (2013.01); *G06F 16/732* (2019.01); *G06F 16/75* (2019.01); *G06F 16/7867* (2019.01)

(58) Field of Classification Search
CPC .................................................. G06F 16/7837
See application file for complete search history.

(56) References Cited

U.S. PATENT DOCUMENTS

2020/0074321 A1    3/2020   Chungapalli et al.
2020/0342859 A1   10/2020   Aher et al.

*Primary Examiner* — Roland J Casillas
(74) *Attorney, Agent, or Firm* — HALEY GUILIANO LLP

(57) ABSTRACT

Systems and methods are described for providing a reply to a query related to a media asset. A query may be received from a user while the media asset is being played on a first device, and in response to determining that the query is related to the media asset, a snapshot of the media asset may be captured, where the snapshot comprises a depiction of a first object and a second object, and the snapshot may be generated for display at a second device. In response to determining there is ambiguity whether the query is related to the first or second object, a disambiguating query based on the first and second objects of the snapshot may be generated for simultaneous output with the snapshot. In response to receiving a reply to the disambiguating query, a response to the query may be generated for output based on the reply.

20 Claims, 10 Drawing Sheets

| Video Frame Information (00:41-00:45) | | | | | 500 |
|---|---|---|---|---|---|
| | | | 518 | 520 | 522 |
| Actor 1: Leonardo DiCaprio | | | | | |
| Category | Characteristic | Value | Confidence Score | Prominence Score | Past Success Rate Score |
| Current Media Asset | The Great Gatsby | Jay Gatsby | 1.0 | - | - |
| Appearance | Short Sleeve Shirt | Black (Armani) | 1.0 (0.3) | 0.6 | 0.8 |
| | Jeans | White (Levi) | 0.9 (0.4) | 0.1 | 0.3 |
| | Shoes | White (Prada) | 0.9 (0.3) | 0.1 | 0.3 |
| Location Relative to Other Objects | Right | Desk, Actor 2 | 0.9 | - | 0.3 |
| | Left | Edge of screen | 1.0 | - | 0.4 |
| | Below | Chair, Edge of Screen | 0.9 | - | 0.3 |
| | Above | Edge of screen | 1.0 | - | 0.4 |
| Other Roles | The Revenant | Hugh Glass | 1.0 | - | 0.6 |
| | Titanic | Jack Dawson | 1.0 | - | 0.8 |

501

| | | | 524 | 526 | 528 |
|---|---|---|---|---|---|
| Actor 2: Tobey Maguire | | | | | |
| Category | Characteristic | Value | Confidence Score | Prominence Score | Past Success Rate Score |
| Current Media Asset | The Great Gatsby | Nick Carraway | 1.0 | - | 0.3 |
| Appearance | Short Sleeve Shirt | White (Polo) | 0.9 (0.5) | 0.4 | 0.3 |
| | Jeans | White (Wrangler) | 0.9 (0.3) | 0.1 | 0.4 |
| | Shoes | Black (Nike) | 0.9 | 0.2 | 0.7 |
| Location Relative to Other Objects | Right | Edge of Screen | 1.0 | - | 0.4 |
| | Left | Desk, Actor 1 | 0.9 | - | 0.5 |
| | Below | Chair, Edge of screen | 1.0 | - | 0.5 |
| | Above | Edge of screen | 1.0 | - | 0.5 |
| Other Roles | Spider-Man | Peter Parker | 1.0 | - | 0.8 |

FIG. 5

Video Frame Information (00:46-00:49)

Car

| Category | Characteristic | Value | Confidence Score | Prominence Score | Past Success Rate Score |
|---|---|---|---|---|---|
| | Make | Mercedes-Benz | 0.8 | 0.5 | 0.6 |
| | Model | C200 | 0.7 | 0.2 | 0.5 |
| Appearance | Color | White | 0.8 | 0.7 | 0.5 |
| | In motion | Yes | 0.9 | 0.9 | 0.3 |

602 — Category
604 — Characteristic
606 — Appearance
608 — (In motion)
610 — Confidence Score
612 — Prominence Score
614 — Past Success Rate Score

SYSTEM AND METHODS FOR RESOLVING QUERY RELATED TO CONTENT

BACKGROUND

This disclosure is directed to, while a media asset is being played, providing a reply to a user query related to the media asset. Specifically, techniques are disclosed for generating for simultaneous output a snapshot comprising a depiction of the media asset and a disambiguating query based on a first object and a second object included in the snapshot.

SUMMARY

Many users have become accustomed to interacting with digital assistant applications or applications providing digital assistant capabilities (e.g., voice-based, text-based, a combination thereof, etc.). For example, a digital assistant may receive a request from a user to play a movie, find local restaurants in his or her area, or provide a weather report. However, digital assistants often receive ambiguous queries which are difficult to answer (e.g., based on limited information provided in the query). For example, if a digital assistant receives a query of "Who is the actor in Harry Potter?" the digital assistant may determine that it is unclear which actor the user is asking about, e.g., is it the actor who plays Dumbledore, the actor who plays Harry Potter, or the actor who plays Ron Weasley, etc. In an approach, the system may simply guess at what the user meant when providing a response (e.g., the system may guess that user is referring to the actor who plays Harry Potter because he is more popular). This approach is deficient, because the system does not provide the user an opportunity to clarify who he or she intended to reference by the query, and the system may merely be providing information that the user already knows or is not interested in.

To overcome this problem, the system may prompt the user to reply to another query, such as "What other movies have you seen the actor in?" in an effort to clarify which actor was intended by the initial query. However, this approach also faces certain problems. For example, the digital assistant may simply receive another unhelpful or ambiguous reply (e.g., "I don't know" or "He was also in that movie with the dog") from the user, and this dialog may continue (e.g., digital assistant "How old does he look?"; user: "16," etc.). That is, in such approach, the digital assistant often fails to generate helpful prompts that quickly identify the intent of the initial query received from the user. Even if the digital assistant eventually returns the correct answer based on the intent of the initial query, the process of such a prolonged dialogue by the digital assistant unnecessarily consumes resources (e.g., memory and processing power) and may be time-consuming and frustrating for the user such that the user loses interest in the answer to the query by the end of the process. Indeed, the user may forget what the initial query was about, or what the context was (e.g., a scene of a current movie) that prompted the user to input the query.

To overcome these problems, systems and methods are provided herein for receiving a query from a user while a media asset is being played on a first device, and in response to determining that the query is related to the media asset, causing capture of a snapshot of the media asset being played on the first device, wherein the snapshot comprises a depiction of a first object and a second object, and causing the captured snapshot to be generated for display on a second device. In response to determining that the query is ambiguous as to whether the query is related to the first object or the second object of the snapshot, the systems and methods provided herein generate for simultaneous output with the snapshot a disambiguating query based on the first object and the second object of the snapshot, and in response to receiving a reply to the disambiguating query, generate for output a response to the query based on the reply.

Such aspects enable a system to efficiently generate an optimal query to disambiguate a query received from a user based on one or more of a variety of factors, in order to minimize or avoid an extensive dialogue between the system and the user. For example, such systems and methods may analyze one or more frames of a media asset (related to the query and being played while the query is received) for attributes to generate a disambiguating query to enable a user to provide feedback to quickly clarify the initial query (e.g., refer to features that are largest or most conspicuous on the screen and with a likelihood of being maximally disambiguating). In some embodiments, such aspects simultaneously provide (e.g., at a mobile device of a user) a snapshot of a portion of the media asset that relates to query received from the user along with a disambiguating query, while the media asset continues playing at a first device (e.g., a television in the vicinity of the user). In this way, the system enables receiving a reply from the user to the disambiguating query to discern the intent of the initial user query while enabling the user to reference the relevant snapshot of the media asset that relates to the initial query (e.g., in case the user forgets objects in the scene of the media asset he or she was initially referencing). For example, the system may generate for display on the second device (e.g., a mobile device of the user) a prompt for the user to select an actor from among multiple actors in a particular scene captured in the snapshot to accelerate the process of clarifying which actor was the subject of the user's initial query. This may avoid the need for the system to generate an extensive conversation or dialog of queries by receiving and analyzing replies to such queries in order to disambiguate the initial query, thereby conserving computing resources.

In some embodiments, generating for output the disambiguating query comprises generating for display an overlay highlighting the first object and the second object, and prompting the user to select either the first object or the second object.

In some aspects of this disclosure, generating for output the disambiguating query comprises modifying the display of the snapshot to zoom in on the portions of the snapshot corresponding to the first object and the second object, and prompting the user to select either the first object or the second object.

In some embodiments, causing the capture of the snapshot of the media asset is performed in response to determining that simultaneous display of each of the first object and the second object in the media asset will cease within a predetermined period of time. Such aspects enable the system to selectively generate the snapshot in a case that a current scene (e.g., depicting multiple actors, where the query received from the user is ambiguous as to which actor is the subject of the query) is to conclude in favor of a new scene (e.g., in which the actors are not depicted) prior to resolving the query, whereas the system may refrain from generating the snapshot in a case that the query is likely to be resolved prior to the current scene (e.g., depicting the aforementioned multiple actors) concluding (e.g., if the screen is to remain relatively unchanged for longer than a predefined period).

In some aspects of this disclosure, the provided systems and methods cause the second device to generate for display a graphical user interface comprising selectable options to control the playing of the media asset on the first device, where the simultaneous output of the snapshot and the disambiguating query comprises generating for display the snapshot and the disambiguating query at the graphical user interface of the second device.

In some embodiments, generating for output the disambiguating query comprises identifying the first and second objects in the snapshot, determining at least one attribute associated with each of the first object and the second object, and generating the disambiguating query based on the attributes of each of the first object and the second object.

In some aspects of this disclosure, the snapshot comprises a plurality of pixels, and determining the at least one attribute associated with each of the first object and the second object comprises determining a number of pixels associated with the first object and determining a number of pixels associated with the second object, and in response to determining the first object is associated with a greater number of pixels than the second object, generating the disambiguating query based on the first object.

In some embodiments, the systems and methods provided herein include provisions for identifying a type of the first and second objects in the snapshot; querying a database to determine a disambiguation success rate associated with a type of the first object and a disambiguation success rate associated with a type of the second object; and in response to determining the first object is associated with a type associated with a greater disambiguation success rate than a type of the second object, generating the disambiguating query based on the first object.

In some aspects of this disclosure, the systems and methods provided herein include provisions for determining a confidence level associated with a classification of the first object; determining a confidence level associated with a classification of the second object; in response to determining the first object is associated with a higher classification confidence level than the second object, generating the disambiguating query based on the first object.

In some embodiments, the systems and methods provided herein include provisions for receiving an additional reply, wherein the additional reply is a reply to the response that was generated for output based on the reply to the disambiguating query; and generating for output an additional disambiguating query based on the additional reply, wherein generating the disambiguating query comprises: identifying a plurality of attributes of each of the first object and the second object; generating a plurality of candidate disambiguating queries based on the first object and the second object; and selecting as the disambiguating query a candidate disambiguating query of the plurality of candidate disambiguating queries that is likely to disambiguate the query with the fewest number of additional disambiguating queries.

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which:

FIG. 5 shows exemplary an data structure used for generating a disambiguating query based on a first object and a second object depicted in a media asset, in accordance with some embodiments of this disclosure;

FIG. 6 shows an exemplary data structure used for generating a disambiguating query based on a first object and a second object depicted in a media asset, in accordance with some embodiments of this disclosure;

DETAILED DESCRIPTION

Figure 1:
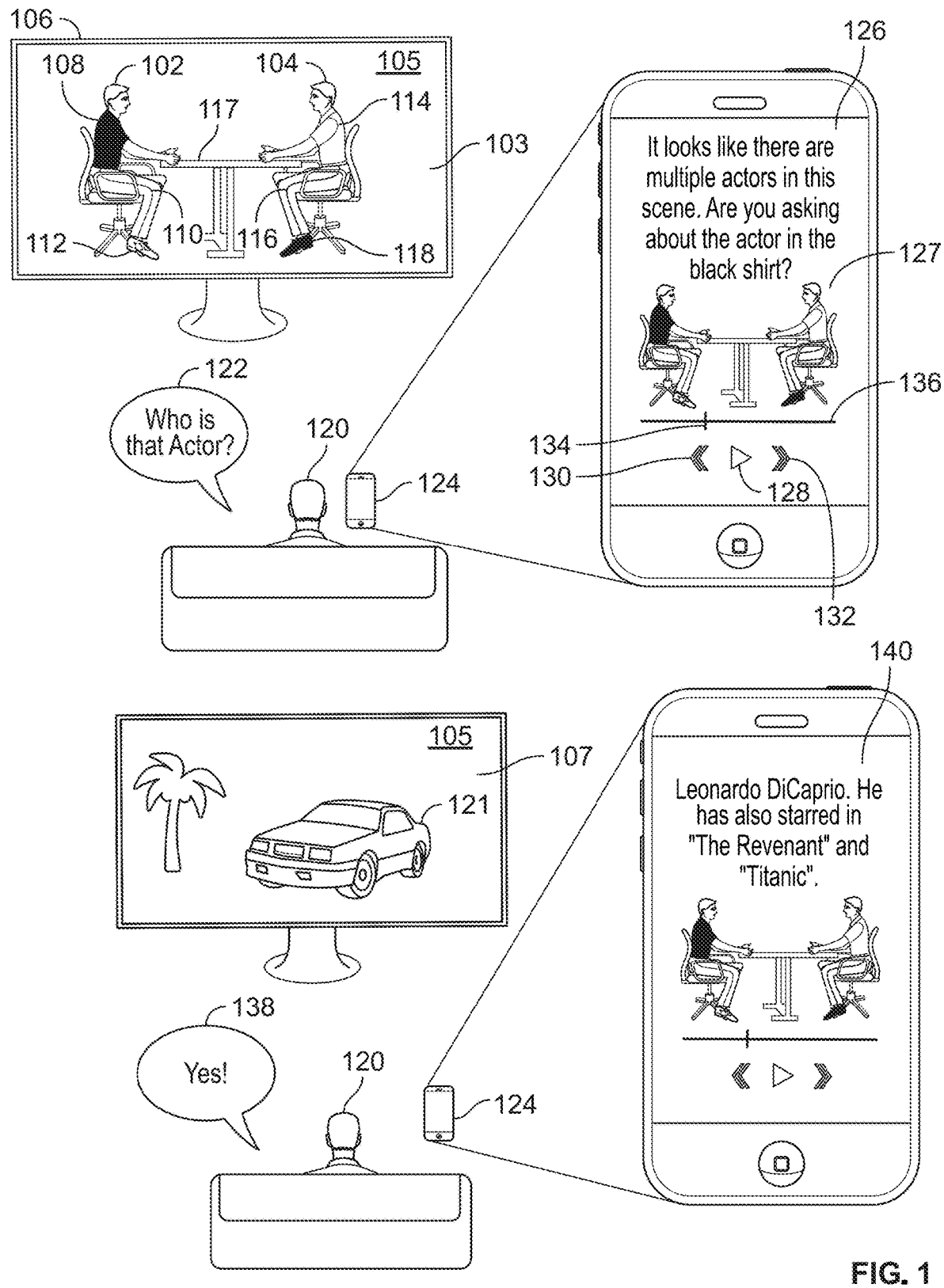
FIG. 1 shows a block diagram of an illustrative system for generating a disambiguating query based on a first object and a second object of a snapshot, in accordance with some embodiments of this disclosure.

FIG. 1 shows a block diagram of an illustrative system for generating a disambiguating query based on a first object and a second object of a snapshot, in accordance with some embodiments of this disclosure. A media application (e.g., executed at least in part on user equipment 106 and/or user equipment 124) receives query 122 (e.g., "Who is that actor?") from user 120 while generating for display media asset 105 (e.g., "The Great Gatsby") on one or more of user equipment 106 and/or user equipment 124. Scene 103 of media asset 105 being generated for display at user equipment 106 when query 122 is received by the media application may depict a variety of objects, e.g., a first actor 102 and a second actor 104 sitting at desk 117. As referred to herein, the term "media asset" should be understood to refer to an electronically consumable asset, e.g., television programming, as well as pay-per-view programs, on-demand programs (as in video-on-demand (VOD) systems), Internet content (e.g., streaming content, downloadable content, webcasts, etc.), video clips, audio, playlists, websites, articles, electronic books, blogs, social media, applications, games, and/or any other media or multimedia, and/or combination of the above.

In some embodiments, the media application may be implemented as a remote control application (e.g., on a mobile device, such as user equipment 124, and/or implemented on a remote server and pushed to user equipment 124) that is in communication with the media application running on user equipment device 106 (e.g., via a home network or via a server). The remote control application may be configured to control presentation of media asset 105 on user equipment 106, as well as to receive query 122. For example, the media application may provide a play option 128, a skip backward option 130, a skip forward option 132, a playback status bar 136 that indicates a playback position 134 within the duration of media asset 105, where playback position indicator 134 by be dragged or swiped to cause media asset 105 being played on user equipment 106 to be rewound (e.g., based on receiving a user gesture to swipe left) or fast-forwarded (e.g., based on receiving a user gesture to swipe right).

Figure 7:
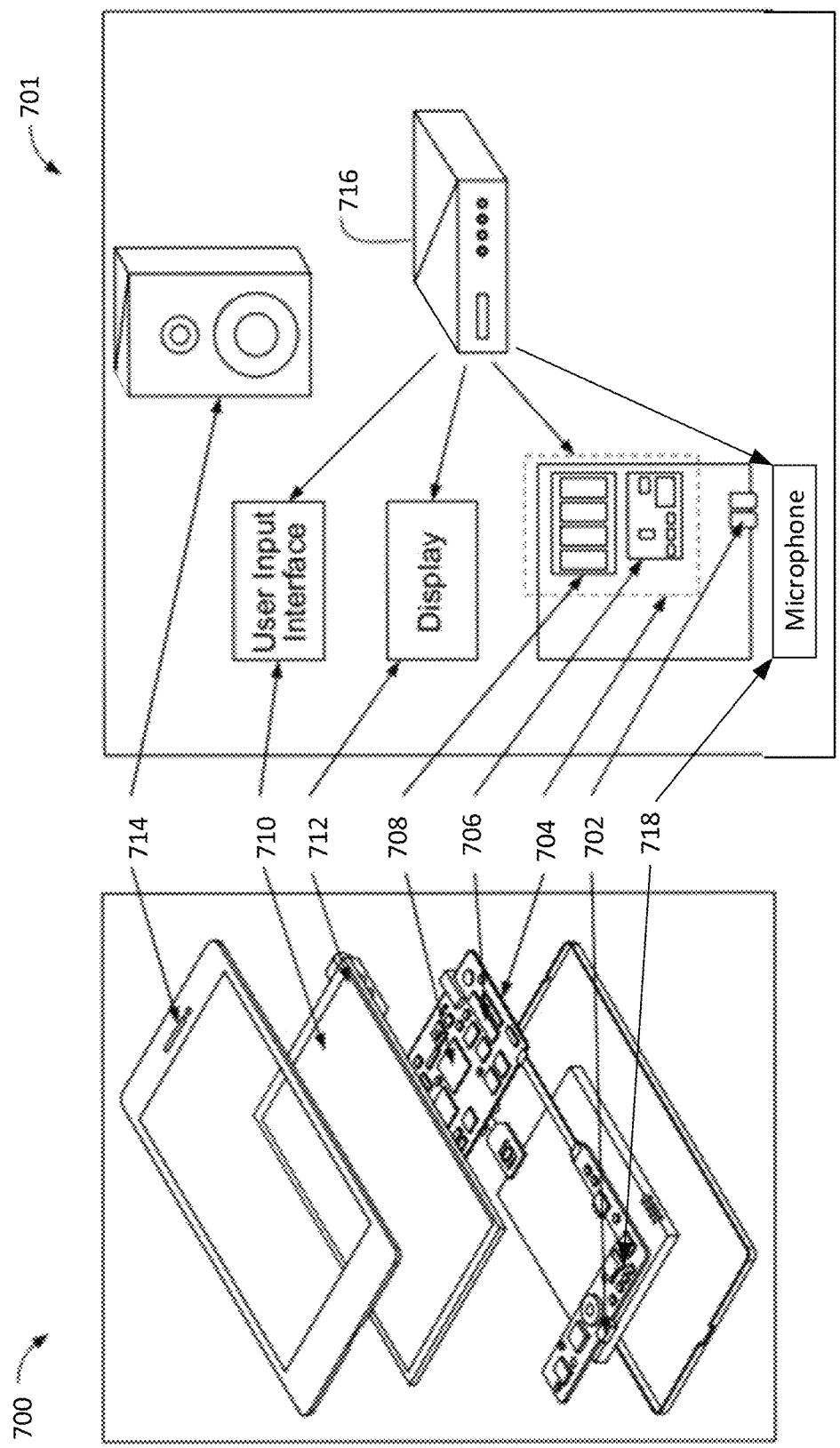
FIG. 7 shows a block diagram of an illustrative media device used in generating a disambiguating query based on a first object and a second object depicted in a media asset, in accordance with some embodiments of this disclosure.

The media application may receive the query in any suitable format (e.g., text-based input, audio or voice input, touch input, biometric input, or any combination thereof) via a suitable interface (e.g., input interface 710, microphone 718 of FIG. 7, etc.). The media application may (e.g., in a case that query 122 is received in the form of voice or audio) transcribe the input into a string of text using any suitable automatic speech recognition technique, or transcription of the audio signal may be achieved by external transcription services (e.g., Amazon Transcribe by Amazon, Inc. of Seattle, WA and Google Speech-to-Text by Google, Inc. of Mountain View, CA). The transcription of audio is discussed in more detail in U.S. patent application Ser. No. 16/397,004, filed Apr. 29, 2019, which is hereby incorporated by reference herein in its entirety. In a case that query 122 is received in the form of text or other user input, the media application may not perform transcription of the query.

Various machine learning models may be employed to interpret received query 122 e.g., recurrent neural networks, bidirectional recurrent neural networks, LSTM-RNN models, encoder-decoder models, transformers, conditional random fields (CRF) models, etc. Such one or more models may be trained to take as input labeled audio files or utterances, and output one or more candidate transcriptions of the audio file or utterance. In some embodiments, the media application may pre-process the received audio input for input into the neural network, e.g., to filter out background noise and/or normalize the signal, or such processing may be performed by the neural network. In some embodiments, in generating the candidate transcriptions, the automatic speech recognition system may analyze the received audio signal to identity phonemes (i.e., distinguishing units of sound within a term) within the signal, and utilize statistical probability techniques to determine most likely next phonemes in the received query. For example, the neural network may be trained on a large vocabulary of words, to enable the model to recognize common language patterns and aid in the ability to identify candidate transcriptions of query 122. In some embodiments, rule-based NLP techniques or algorithms may be employed to parse text included in query 122. For example, NLP circuitry or other linguistic analysis circuitry may apply linguistic, sentiment, and grammar rules to tokenize words from a text string, and may perform chunking of the query, which may employ different techniques, e.g., N-gram extraction, skip gram, and/or edge gram; identify parts of speech (i.e., noun, verb, pronoun, preposition, adverb, conjunction, participle, article); perform named entity recognition; and identify phrases, sentences, proper nouns, or other linguistic features of the text string. In some embodiments, a knowledge graph may be employed to discern relationships among entities.

In some embodiments, the NLP system may employ a slot-based filling pipeline technique and templates in generating disambiguating queries and/or replies to queries received from user 120, to discern an intent of a query. For example, the media application may reference a collection of predetermined template queries having empty slots to be filled. In some embodiments, the predetermined templates may be utilized in association with a knowledge graph to determine relationships between terms of a query.

For example, in such slot-based filling pipeline, in the event that the NLU system determines that a received query is related to an actor or actress being depicted on the screen, the slots may contain local attributes such as top, bottom, left and right objects. For a disambiguating query, the slot may be filled, and a reply to the (disambiguated) query may be supplied, once the necessary slots are filled, and the system may supply choices to the user by providing differentiable attributes for the set of entities or personalities. For example, if ENTITY_P1 may resolve to an object depicted on the screen, and a query may be formed using available attributes of the object, e.g., a template may comprise any of "Wearing SLOT_COLOR shirt and beside SLOT_RIGHT_OBJECT"; "The one in front of SLOT_MAKE_SLOT_MODEL." "The one left of SLOT_RIGHT_OBJECT." The media application may utilize templates for each object or personality being spoken of in the context of media asset 105 and generate valid identifier queries for each of them (e.g., to fill a response query that is presented to user 120 to confirm the preferred entity or object that user 120 is interested in). In some embodiments, the use of templates may enable the media application to reference the predefined clarification queries rather than an entire set of objects. As an example, upon receiving a query from a user of "What's his name walking along with Tom Cruise?", the media application may determine that such query is partially filled query, e.g., Tom Cruise fills one of the slots, and the system may follow up with "The one wearing a tuxedo and boots?", and in response to receiving user confirmation, provide the reply of "He is a Golden Globe nominated actor named Tobey Maguire."

Figure 3:
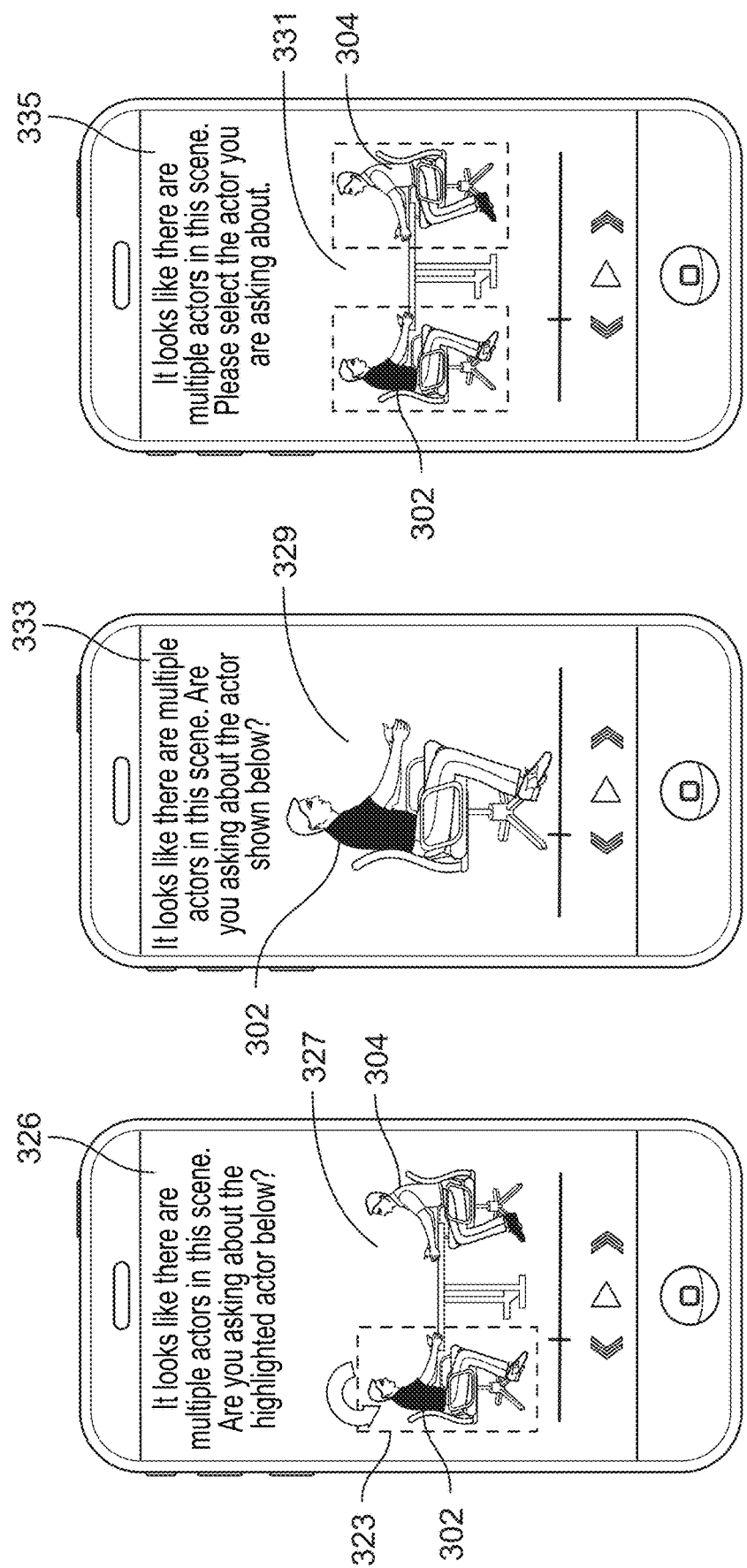
FIGS. 3A-3C shows exemplary snapshots of a media asset, in accordance with some embodiments of this disclosure.

The media application may determine, e.g., after employing the aforementioned automatic speech recognition, NLP and/or slot filling techniques, a meaning and intent of query 122, that query 122 is ambiguous. For example, the media application may determine that the one or more frames of media asset 105 being played on user equipment 106 depicts two actors 102 and 104, and thus it is unclear which one of actor 102 or 104 is intended to be referenced by query 122. The media application may generate disambiguating query 126 (e.g., "It looks like there are multiple actors in this scene. Are you asking about the actor in the black shirt?) based on one or more of a variety of techniques, that are discussed in more detail in connection with FIGS. 3A-3C. For example, the media application may determine that actor 102 is wearing a black shirt 108, white jeans 110, and white shoes 112 and that actor 104 is wearing a white shirt 114, white jeans 116, and black shoes 118, based on metadata associated with media asset 105 and/or based on any suitable algorithm (e.g., object recognition, object classification, or computer vision techniques). In some embodiments, an image of scene 103 may be fed into a third-party application (e.g., Google Lens) to extract objects from the image, characteristics of the objects, and/or a relative locations of objects in a scene (e.g., with respect to other objects and/or edges of the screen). In some embodiments, disambiguating query 126 may be generated for output based on one or more templates stored in a database (e.g., database 805 of FIG. 8). The media application may generate for output disambiguating query 126 in any suitable format (e.g., text-based output, audio or voice output, tactile output, or any combination thereof).

In some embodiments, the media application may generate for display on one or more of user equipment device 106 and/or 124 snapshot 127 of scene 103 of media asset 105 being generated for display when (or within a predetermined time of when) query 122 is received. Snapshot 127 may be pinned to the screen of one or more of user equipment devices 106 and 124 to enable the user to view scene 103 associated with query 122 and reference the objects shown in such scene when providing reply 138 to disambiguating query 126. In some embodiments, the media application may provide snapshot 127 in response to determining (e.g., based on metadata associated with media asset 105) that the current scene 103 associated with snapshot 127 (e.g., depicting actors 102 and 104) is likely to conclude prior to disambiguating query 126 and/or reply 138 being generated for output, or that an upcoming scene 107 (including car 121) to commence prior to disambiguating query 126 and/or reply 138 being generated for output does not depict one or more of actor 102 and actor 104, e.g., the objects at issue in query 122. For example, if the media application determines (e.g., based on metadata associated with media asset 105 and/or by analyzing frames of media asset 105) that a scene associated with snapshot 127 is a long monologue that is scheduled to last for five minutes, snapshot 127 may be less useful to user 120 because the objects at issue (e.g., actor 102 and actor 104) in query 122 are predicted to be, or are known to be, depicted in media asset 105 being played on user equipment 106.

The media application, in response to receiving reply 138 confirming that user 120 intended query 122 to reference actor 102 wearing the black shirt in scene 103 at issue in media asset 105, may generate for output reply 140 following confirmation reply 138 received from user 120. For example, reply 128 may be received by the media application running on user equipment device 124 while a next scene 107 of media asset 105 is playing on user equipment 106. In some embodiments, snapshot 127 may continue to be depicted by the media application when reply 140 is generated for output, to enable user 120 to view scene 103 that was at issue when query 122 was received by the media application. The media application may reference metadata of media asset 105 and/or the Internet (e.g., perform a query to a search engine to determine other movies that Leonardo DiCaprio starred in), a database (e.g., content source 802 of FIG. 8) and/or personal preferences of the user in generating for output the reply.

Figure 2:
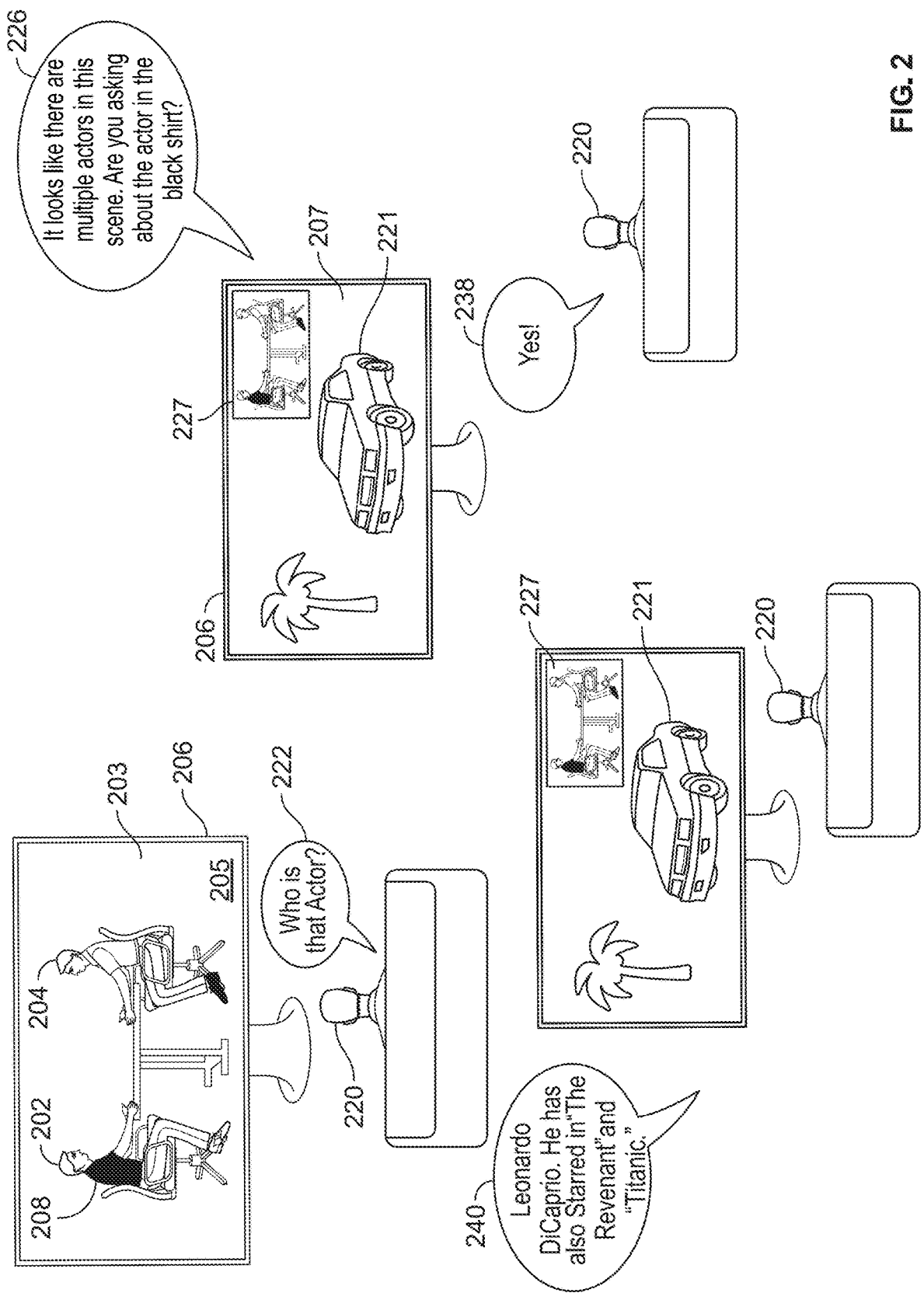
FIG. 2 shows a block diagram of an illustrative system for generating a disambiguating query based on a first object and a second object of a snapshot, in accordance with some embodiments of this disclosure.

FIG. 2 shows a block diagram of an illustrative system for generating a disambiguating query based on a first object and a second object of a snapshot, in accordance with some embodiments of this disclosure. FIG. 2 is similar to FIG. 1 except that FIG. 2 shows query 222 being received by the media application running on user equipment 206 (e.g., a smart television). The media application may generate for display media asset 205 on user equipment 206. While a current scene 203 of media asset is being generated for display (or within a predetermined time thereof), the media application running on user equipment 206 may receive query 222 from user 220. Query 222 may be received by the media application in any suitable format (e.g., text-based input, audio or voice input, touch input, biometric input, or any combination thereof). The media application may, using similar techniques as discussed above, generate disambiguating query 226 based on query 222, in response to determining that query 222 is ambiguous, e.g., as to whether user 220 is referencing actor 202 or actor 204 depicted in scene 203 of media asset 205. In some embodiments, the media application running on user equipment 206 may generate for presentation snapshot 227 of scene 203, displayed in a portion of the screen depicting scene 207 of media asset 205 (e.g., displayed in an upper right-hand corner of the screen to avoid overlapping important portions of scene 207). In some embodiments, disambiguating query 226 may be text-based, e.g., to avoid interrupting audio of scene 207. Additionally or alternatively, the media application may pause media asset 207 while generating for output disambiguating query 226, and the media asset 207 may continue to be paused until reply 238 is received from user 220. The media application running on user equipment 206, in response to receiving confirmatory reply 238 from user 220, may generate for output reply 240, e.g., to provide an answer to the (now-clarified) query 222 of user 220.

FIGS. 3A-3C shows exemplary snapshots of a media asset, in accordance with some embodiments of this disclosure. The media application may generate for output snapshots 327, 329, 331 (e.g., which may correspond to snapshots 127 and 227 of FIGS. 1 and 2, respectively) in a variety of formats. Snapshot 327 may comprise indicator 323 to highlight and/or otherwise emphasize an object (e.g., actor 302) and/or a sub-element of the object (e.g., black shirt of actor 302) that may potentially be the object of an ambiguous query. For example, the media application may cause a box or overlay 323 to be generated for presentation around actor 302 alongside query 326, to assist the user in clarifying his or her query. The media application may alternatively or additionally generate for display snapshot 329 by zooming in on actor 302 at issue (and/or cropping out other portions of the relevant scene), along with query 333 referencing the "actor shown below," e.g., to enable the media application to receive clarification form the user without any extraneous objects located in snapshot 329. In some embodiments, the media application may alternatively or additionally generate for display snapshot 331, which, along with disambiguating query 335, prompts a user to select the object he or she intended to refer to, e.g., actor 302 or actor 304. In response to receiving selection of one of the objects, e.g., a portion of the screen depicting actor 302, via a touch-sensitive screen, the media application may generate for output a reply to the confirmatory reply received from a user.

Figure 4:
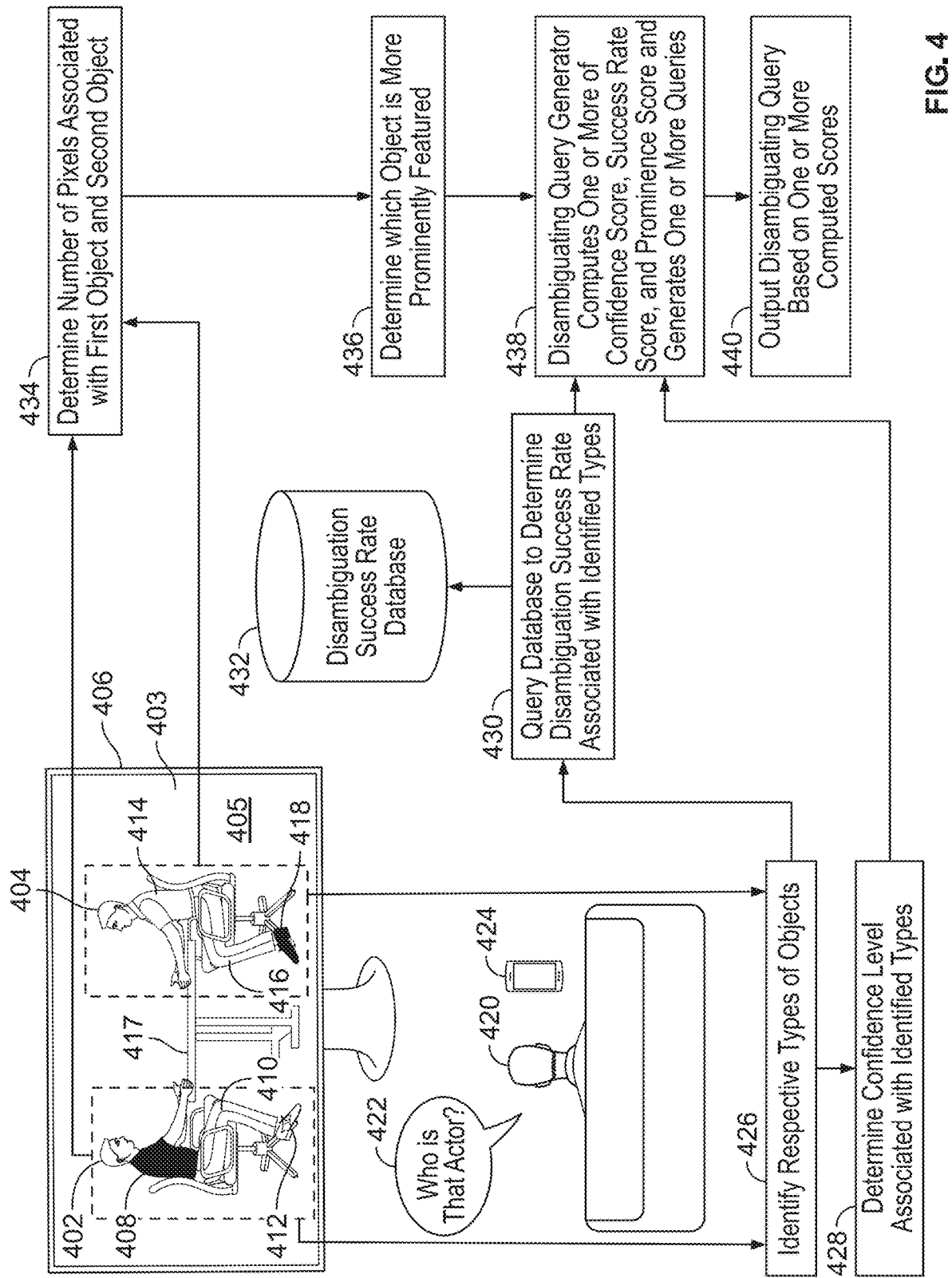
FIG. 4 shows a block diagram of an illustrative system for generating a disambiguating query based on a first object and a second object of a snapshot, in accordance with some embodiments of this disclosure.

FIG. 4 shows a block diagram of an illustrative system for generating a disambiguating query based on a first object and a second object of a snapshot, in accordance with some embodiments of this disclosure. The media application may generate for display media asset 405 on user equipment 406, and perform processing shown in FIG. 4 in response to receiving a query (e.g., "Who is that actor?") while scene 403 is being played.

At 426, the media application may identify the respective types of objects depicted in scene 403. For example, the media application may perform object or pattern recognition techniques, and/or edge detection or computer vision techniques on the image of scene 403 (and one or more associated frames or frames within a predetermined period thereof) to identify people, places, things, events, any other suitable objects, or any combination thereof, depicted therein. For example, detected object features thereof may be compared (e.g., pixel by pixel) to objects and associated features stored in a database (e.g., database 805 of FIG. 8) to determine whether the detected features match an object in the database. For example, the media application may identify an object in a scene at issue as a car (e.g., based on having a similar shape and size as an object stored in the database). In some embodiments, the media application may identify type of objects based on metadata associated with media asset 405 (e.g., indicating which actors are in a particular scene). In some embodiments, machine learning models (e.g., native Bayes model, logistic regression, neural networks, etc.) may be employed to classify objects extracted from scene 403. For example, the model may be trained on a plurality of labeled image pairs, where image data may be preprocessed and represented as feature vectors. In some embodiments, a third-party application may be utilized to extract objects from an image associated with scene 403.

At 428, the media application may determine a confidence level associated with the identified types. For example, the aforementioned image processing algorithm may output a confidence level associated with a prediction of a type of the object identified in scene 403. In some embodiments, the confidence level may be based on a percentage of features of the extracted object that match features of an object in the database (e.g., database 805 of FIG. 8), and/or the number of times the candidate object has been identified in the past. In some embodiments, the media application may retrieve information (e.g., from media content source 802 or based on an Internet search) to determine whether the predicted object is likely to be accurate (e.g., to confirm that a particular actor appears in the currently playing media asset). The confidence level, along with the identified type, may be provided to disambiguating query generator 438, which may be implemented by the media application.

At 430, based on the types of objects identified at 426, the media application may query database 432 to determine a disambiguation success rate associated with identified types of objects. For example, the media application may identify desk 417 and actor 402 wearing a black shirt, and may query database 432 to determine which object (e.g., in connection with media asset 405 or other media assets depicting similar objects) has been more successful in generating a disambiguating query in the past to predict user familiarity with each object. If the media application determines that disambiguating queries associated with features or the location of desk 417 have historically had a relatively low success rate (e.g., only 25% of such queries successfully disambiguated an initial query without requiring follow-up clarifying queries), but disambiguating queries associated with features or the location of the black shirt of actor 402 have been more successful (e.g., 75% of such queries successfully disambiguated an initial query without requiring follow-up clarifying queries), the media application may determine that a disambiguating query associated with the black shirt of actor 402 is preferable. Such success rate information may be provided to disambiguating query generator 438.

At 434, the media application may determine a number of pixels (or percentage of a current display) associated with each of the first object (e.g., actor 402) and the second object (e.g., actor 404). The media application may make this determination based on metadata associated with the media asset 405 (e.g., retrieving coordinates of objects in scene 403), and/or based on edge detection techniques to determine boundaries (e.g., edges, shape outline, border) of objects of scene 403 and/or analyzing pixel values of the area surrounding objects. For example, if the media application detects that brightness of adjacent pixels abruptly changes, the media application may determine that this is indicative of an edge of an object, and may calculate the number of pixels of the object based on the determined edges being the perimeter of the object. In some embodiments, the media application may use similar techniques to determine a number of pixels associated with objects that are sub-elements of a larger object (e.g., a number of pixels occupied by black shirt 408 being worn by actor 402, or a number of pixels associated with shoes 418 and/or pants 416 of actor 404). In some embodiments, the media application may assign certain features (e.g., a bright red sports car) depicted in a particular scene a higher prominence level than more common or mundane features (e.g., a gray van), to reflect the likelihood that a particular object is capturing the attention of the user and thus may be a suitable candidate for a disambiguating query. The media application may perform this determination by, for example, referencing a database storing information regarding which images are more likely to capture user attention, and/or based on identifying keyword tags for a particular scene (e.g., retrieved from metadata or generated based on image analysis) and referencing a corpus to determine which keywords are less common than others.

At 436, the media application may determine which objects (or sub-elements thereof) are prominently featured (e.g., the media application may determine that actor 402 is associated with more pixels of an image of scene 403 than actor 414, and/or that black shirt 408 of actor 402 is associated with more pixels than shoe 412). The media application may output such determinations to disambiguating query generator 438. In some embodiments, vector graphics may be employed in depicting scenes of media asset 105, and in such instance the media application may determine that when a particular object occupies more space on the screen than another object, that such object occupying more space is more prominent.

Disambiguating query generator 438 may compute one or more scores based on one or more of the input attributes (e.g., amount of pixels associated with each object, success rate of identified objects, confidence level of identified objects). In some embodiments, the media application may generate a data structure (e.g., as shown in FIGS. 5 and 6) for use by the disambiguating query generator in generating a suitable disambiguating query.

For example, based on the determined confidence level at 428, the media application may compute a score of 0.8 for a car predicted to be a specific model of a Mercedes-Benz (e.g., indicating the media application has determined there is a 70% probability that an identified object is a C200 Mercedes-Benz, as shown in the data structure of FIG. 6) and a score of 1.0 for shirt 408 of actor 402 predicted to be black (e.g., indicating the media application has determined there is a 100% probability that an identified object is a black shirt, as shown in the data structure of FIG. 5). In some embodiments, disambiguating query generator 438 may compute a success rate score based on determined success rate at 430. For example, as shown in FIG. 5, the media application may determine a past success rate score of 0.8 for black Armani shirt 408 (or similar objects thereto), indicating that 80% of disambiguating queries that referenced shirt 408 were successful in disambiguating query 422 received from a user. The media application may determine, on the other hand, that shoes 412 are associated with a success rate of 0.3, e.g., indicating that past disambiguating queries that reference shoes 412 (or similar objects thereto) only had a 30% success rate in disambiguating query 422 received from a user. Alternatively or additionally, the media application may compute a prominence score based on the determined number of pixels associated with the identified objects (and/or sub-elements of the identified objects. For example, as shown in FIG. 5, the media application may determine that black Armani shirt 408 is associated with a 0.6 prominence score (e.g., based on a number of pixels and optionally based on a color or overall appearance of shirt 408) whereas white polo shirt 414 is associated with a 0.4 prominence score. In some embodiments, the media application may sum the prominence scores of each element of an object to determine an overall prominence score for the object (e.g., the media application may determine that actor 402 is associated with a 0.8 prominence score based on a prominence scores of 0.6, 0.1, and 0.1 for shirt 408, jeans 410 and shoes 412).

Disambiguating query generator 438, which may be implemented by the media application, may generate for output one or more disambiguating queries in reply to query 422 based on one or more of the computed confidence score, success rate score and prominence score. In some embodiments, the media application may determine the highest score from among the computed confidence score, success rate score and prominence score for scene 403 and generate a disambiguating query based on such highest score. For example, for scene 403, the media application may determine that since black short sleeve shirt 408 received a confidence score of 1.0 in the example of FIG. 5, and no other score is higher than such confidence score, the disambiguating query should focus on black shirt 408 of actor 402. In some embodiments, the media application may compute an aggregated score based on at least two of the computed confidence score, success rate score and prominence score, to determine how to best generate a disambiguating query. For example, the media application may determine that the disambiguating query should focus on actor 402 rather than actor 404, since the combined confidence score, prominence score and past success rate score for actor 402 exceeds that of actor 404. In some embodiments, a predetermined formula may be utilized, to select certain attributes if a score for such attributes exceeds a predetermined amount. In some embodiments, machine learning techniques may be employed to identify patterns in data provided to a machine learning model, where the data may relate to past disambiguating queries that proved successful, e.g., to predict which attribute the disambiguating query should relate to in the current instance.

In some embodiments, the media application may select a minimal set of attributes for each object when generating a disambiguating query to minimize the number of disambiguating queries and length of disambiguating queries. For example, if the media application determines that that two or more actors in a scene are wearing a red shirt, the media application may focus on a different attribute for the disambiguating query that is more likely to be distinctive within the current scene, even if the shirts otherwise are associated with high prominence, confidence or success rate scores (e.g., a prediction of how well an object in the context of a current scene can assist with disambiguation). For example, the media application may identify a distinctive feature (e.g., a top hat) by determining that only a single instance of such object is present in a scene. The media application may additionally or alternatively focus on the most basic attributes to ensure the attributes used are understandable to the user (e.g., actor sitting down or actor standing up, adult actor versus young child actor). For example, the media application may reference a graph database structure to identify which attributes a user may be more likely to recognize. In some embodiments, the media application may take into account notable events that occurred or are occurring when query 422 is received (e.g., "Are you asking about the actor who just dunked a basketball?").

In some embodiments, a character resolver framework may be employed when framing questions back to the user for confirmation of pronouns used in the query. An occurrence of a pronoun to identify a user or an object may be resolved into a temporary name based on the context available with additional support for partially filled characters. In some embodiments, if the media application receives a query "Who is that?", the media application may respond with "Are you asking about the actor?", based on resolving the pronoun in the context of a current scene of a media asset being played while the query is received. Pronoun resolution is discussed in more detail in U.S. Patent Application Publication No. US 2020/0074321 A1, filed Feb. 28, 2019, which is hereby incorporated by reference herein in its entirety.

At 440, the media application may output a disambiguating query based on the processing performed at 438. The media application may receive a confirmatory reply (e.g., reply 138 of FIG. 1 of "Yes" confirming that the subject of query 122 is actor 102), and output a reply 140 to the (now-disambiguated) query 122. In some embodiments, the media application may determine that reply 138 is not a confirmatory reply but rather is another ambiguous statement, e.g., "I am asking about the actor who is sitting down" when both actors are sitting down), and in response the media application may proceed through the steps of FIG. 4 to identify an additional disambiguating query focusing on attributes different from those of the disambiguating query output at 440 (e.g., since the user was not receptive to the initial disambiguating query).

FIG. 5 shows exemplary data structures 500, 501 used for generating a disambiguating query based on a first object and a second object depicted in a media asset, in accordance with some embodiments of this disclosure. Data structure 500 may be generated based one or more of metadata associated with a media asset and image processing performed by the media application. In some embodiments, each of a predefined number of frames or segments of a media asset may be associated with a corresponding data structure, e.g., 00:41-00:45 playback position. Exemplary data fields of data structure 500 may correspond to data related to an identified object (e.g., "Actor: Leonardo DiCaprio," which may correspond to actor 102 of FIG. 1), current media asset 502 (e.g., "The Great Gatsby," which may correspond to actor 105 of FIG. 1); appearance 504 (e.g., apparel being worn by actor 102), location 506 related to other objects (e.g., location of other objects, or edges of the screen, with respect to actor 102), and other roles (e.g., other media content that actor 102 has been cast in, such as "The Revenant" and "Titanic"). For example, media application, in generating reply 144 of FIG. 1, which includes a reference to "The Revenant" and "Titanic," may reference data field 508. Exemplary data fields of data structure 501 may correspond to data related to an identified object (e.g., "Actor: Tobey Maguire," which may correspond to actor 104 of FIG. 1), current media asset 510 (e.g., "The Great Gatsby" which may correspond to actor 105 of FIG. 1); appearance 512 (e.g., apparel being worn by actor 104), location 514 relative to other objects (e.g., location of other objects, or edges of the screen, with respect to actor 104), other roles (e.g., other media content that actor 104 has been cast in, such as "Spider-Man"). In some embodiments, each data structure may comprise static attributers (e.g., the name of the media asset, the name of the actor, etc., which are consistent throughout the duration of the media asset) and/or dynamic attributes (e.g., which change based on a current scene of the media asset, such as which objects are in a vicinity of the object at issue or what an actor's appearance looks like).

Such data structures 500, 501 may be referenced in generating a disambiguating query (e.g., query 140 of FIG.

1), e.g., confidence score 518, prominence score 520, past success rate score 522 of data structure 500, and confidence score 524, prominence score 526, past success rate score 528 of data structure 501. Such data structures 500, 501 may indicate individual scores for multiple objects as well as an aggregate score for an object comprising such multiple objects, e.g., a confidence score for different elements of the appearance of actor 102, as well as an overall confidence score for actor 102.

FIG. 6 shows an exemplary data structure 600 used for generating a disambiguating query based on a first object and a second object depicted in a media asset, in accordance with some embodiments of this disclosure. For example, data structure 600 may include information regarding a car, e.g., car 121 of FIG. 1 during 00:46-00:49 of playback, such as, for example, make 603 (e.g., "Mercedes-Benz"), model 604 (e.g., C200), color (e.g., white), In motion (e.g., Yes). In some embodiments, the media application may reference data structure 600 when determining whether to provide snapshot 127 of FIG. 1 to a user. For example, since actor 102 and/or actor 104 of FIG. 1, determined to be the subject of user query 122, are not referenced in data structure 600, which may correspond to frames immediately after the frames associated with FIG. 5, the media application may determine that a snapshot should be provided. In some embodiments, data structure 600 may be used to generate a reply to a received query of "I like that car", where the reply may be "Which one, are you talking about the C200?" which may be provided based one or more of the confidence score 610, prominence score 612, or past success rate score 614, e.g., relatively high confidence scores of 0.7 and 0.8 for the make and model of the car, respectively. In some embodiments, each data structure may comprise static attributers (e.g., the name of the media asset, the name of the actor, etc., that are consistent throughout the duration of the media asset) and/or dynamic attributes (e.g., which change based on a current scene of the media asset, such as whether the car is in motion or not).

Figure 8:
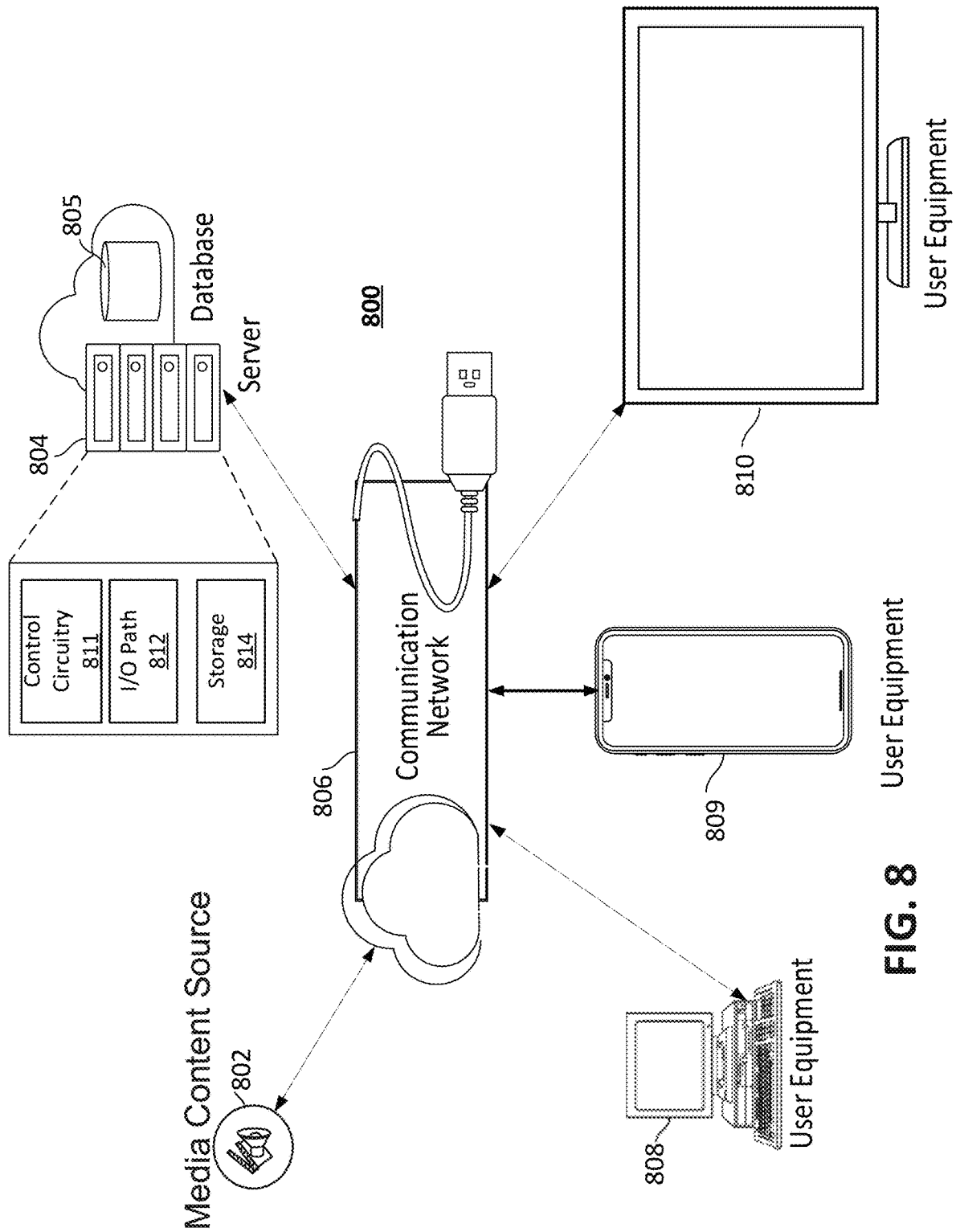
FIG. 8 shows a block diagram of an illustrative media system for generating a disambiguating query based on a first object and a second object depicted in a media asset, in accordance with some embodiments of this disclosure.

FIGS. 7-8 describe exemplary devices, systems, servers, and related hardware for generating a disambiguating query based on a first object and a second object depicted in a media asset, in accordance with some embodiments of the present disclosure. FIG. 7 shows generalized embodiments of illustrative user equipment devices 700 and 701. For example, user equipment device 700 may be a smartphone device. In another example, user equipment system 701 may be a user television equipment system (e.g., user equipment 106 of FIG. 1). User television equipment system 701 may include set-top box 716. Set-top box 716 may be communicatively connected to microphone 718, speaker 714, and display 712. In some embodiments, microphone 718 may receive voice commands for the media application. In some embodiments, display 712 may be a television display or a computer display. In some embodiments, set-top box 716 may be communicatively connected to user input interface 710. In some embodiments, user input interface 710 may be a remote control device. Set-top box 716 may include one or more circuit boards. In some embodiments, the circuit boards may include processing circuitry, control circuitry, and storage (e.g., RAM, ROM, hard disk, removable disk, etc.). In some embodiments, the circuit boards may include an input/output path. More specific implementations of user equipment devices are discussed below in connection with FIG. 7. Each one of user equipment device 700 and user equipment system 701 may receive content and data via input/output (I/O) path 702. I/O path 702 may provide content (e.g., broadcast programming, on-demand programming, Internet content, content available over a local area network (LAN) or wide area network (WAN), and/or other content) and data to control circuitry 704, which includes processing circuitry 706 and storage 708. Control circuitry 704 may be used to send and receive commands, requests, and other suitable data using I/O path 702, which may comprise I/O circuitry. I/O path 702 may connect control circuitry 704 (and specifically processing circuitry 706) to one or more communications paths (described below). I/O functions may be provided by one or more of these communications paths, but are shown as a single path in FIG. 7 to avoid overcomplicating the drawing.

Control circuitry 704 may be based on any suitable processing circuitry such as processing circuitry 706. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 704 executes instructions for the media application stored in memory (e.g., storage 708). Specifically, control circuitry 604 may be instructed by the media application to perform the functions discussed above and below. In some implementations, any action performed by control circuitry 604 may be based on instructions received from the media application.

In client/server-based embodiments, control circuitry 704 may include communications circuitry suitable for communicating with a media application server or other networks or servers. The instructions for carrying out the above mentioned functionality may be stored on a server (which is described in more detail in connection with FIG. 7. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 7). In addition, communications circuitry may include circuitry that enables peer-to-peer communication of user equipment devices, or communication of user equipment devices in locations remote from each other (described in more detail below).

Memory may be an electronic storage device provided as storage 708 that is part of control circuitry 704. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 708 may be used to store various types of content described herein as well as media application data described above. Nonvolatile memory may also be used (e.g., to launch a boot-up routine and other instructions). Cloud-based storage, described in relation to FIG. 7, may be used to supplement storage 708 or instead of storage 708.

Control circuitry 704 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 704 may also include scaler circuitry for upconverting and downconverting content into the preferred output format of user equipment 700. Control circuitry 704 may also include digital-to-analog converter circuitry and analog-to-digital converter circuitry for converting between digital and analog signals. The tuning and encoding circuitry may be used by user equipment device 700, 701 to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 708 is provided as a separate device from user equipment device 700, the tuning and encoding circuitry (including multiple tuners) may be associated with storage 708.

A user may send instructions to control circuitry 704 using user input interface 710. User input interface 710 may be any suitable user interface, such as a remote control, mouse, trackball, keypad, keyboard, touch screen, touchpad, stylus input, joystick, voice recognition interface, or other user input interfaces. Display 712 may be provided as a stand-alone device or integrated with other elements of each one of user equipment device 700 and user equipment system 701. For example, display 712 may be a touchscreen or touch-sensitive display. In such circumstances, user input interface 710 may be integrated with or combined with display 712. Display 712 may be one or more of a monitor, a television, a display for a mobile device, or any other type of display. A video card or graphics card may generate the output to display 712. The video card may be any processing circuitry described above in relation to control circuitry 704. The video card may be integrated with the control circuitry 704. Speakers 714 may be provided as integrated with other elements of each one of user equipment device 700 and user equipment system 701 or may be stand-alone units. The audio component of videos and other content displayed on display 712 may be played through the speakers 714. In some embodiments, the audio may be distributed to a receiver (not shown), which processes and outputs the audio via speakers 714.

The media application may be implemented using any suitable architecture. For example, it may be a stand-alone application wholly-implemented on each one of user equipment device 700 and user equipment system 701. In such an approach, instructions of the application are stored locally (e.g., in storage 708), and data for use by the application is downloaded on a periodic basis (e.g., from an out-of-band feed, from an Internet resource, or using another suitable approach). Control circuitry 704 may retrieve instructions of the application from storage 608 and process the instructions to rearrange the segments as discussed. Based on the processed instructions, control circuitry 704 may determine what action to perform when input is received from user input interface 710. For example, movement of a cursor on a display up/down may be indicated by the processed instructions when user input interface 710 indicates that an up/down button was selected.

In some embodiments, the media application is a client/server-based application. Data for use by a thick or thin client implemented on each one of user equipment device 700 and user equipment system 701 is retrieved on-demand by issuing requests to a server remote to each one of user equipment device 700 and user equipment system 701. In one example of a client/server-based guidance application, control circuitry 704 runs a web browser that interprets web pages provided by a remote server. For example, the remote server may store the instructions for the application in a storage device. The remote server may process the stored instructions using circuitry (e.g., control circuitry 704) to perform the operations discussed in connection with FIGS. 1-3 and 6-7.

In some embodiments, the media application may be downloaded and interpreted or otherwise run by an interpreter or virtual machine (run by control circuitry 704). In some embodiments, the media application may be encoded in the ETV Binary Interchange Format (EBIF), received by the control circuitry 704 as part of a suitable feed, and interpreted by a user agent running on control circuitry 704. For example, the media application may be an EBIF application. In some embodiments, the media application may be defined by a series of JAVA-based files that are received and run by a local virtual machine or other suitable middleware executed by control circuitry 704. In some of such embodiments (e.g., those employing MPEG-2 or other digital media encoding schemes), the media application may be, for example, encoded and transmitted in an MPEG-2 object carousel with the MPEG audio and video packets of a program.

FIG. 8 is a diagram of an illustrative streaming system, in accordance with some embodiments of this disclosure. User equipment devices 808, 809, 810 (e.g., user equipment device 106) may be coupled to communication network 806. Communication network 806 may be one or more networks including the Internet, a mobile phone network, mobile voice or data network (e.g., a 7G or LTE network), cable network, public switched telephone network, or other types of communication network or combinations of communication networks. Paths (e.g., depicted as arrows connecting the respective devices to the communication network 806) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 8 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 806.

System 800 includes a media content source 802 and a server 804, which may comprise or be associated with database 805. Communications with media content source 802 and server 804 may be exchanged over one or more communications paths but are shown as a single path in FIG. 8 to avoid overcomplicating the drawing. In addition, there may be more than one of each of media content source 802 and server 804, but only one of each is shown in FIG. 8 to avoid overcomplicating the drawing. If desired, media content source 802 and server 804 may be integrated as one source device.

In some embodiments, server 804 may include control circuitry 811 and a storage 814 (e.g., RAM, ROM, Hard Disk, Removable Disk, etc.). Storage 814 may store a one or more databases (e.g., disambiguation success rate database 432 of FIG. 4, data structures 500, 501 of FIG. 5, data structure 600 of FIG. 6). Server 804 may also include an input/output path 812. I/O path 812 may provide device information, or other data, over a local area network (LAN) or wide area network (WAN), and/or other content and data to the control circuitry 811, which includes processing circuitry, and storage 814. The control circuitry 811 may be used to send and receive commands, requests, and other suitable data using I/O path 812, which may comprise I/O circuitry. I/O path 812 may connect control circuitry 804 (and specifically processing circuitry) to one or more communications paths.

Control circuitry 811 may be based on any suitable processing circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 811 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, the control circuitry 811 executes instructions for an emulation system application stored in memory (e.g., the storage 814). Memory may be an electronic storage device provided as storage 814 that is part of control circuitry 811.

Server 804 may retrieve guidance data from media content source 802, process the data as will be described in detail below, and forward the data to user equipment devices 808, 809, 810. Media content source 802 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Media content source 802 may be the originator of content (e.g., a television broadcaster, a Webcast provider, etc.) or may not be the originator of content (e.g., an on-demand content provider, an Internet provider of content of broadcast programs for downloading, etc.). Media content source 802 may include cable sources, satellite providers, on-demand providers, Internet providers, over-the-top content providers, or other providers of content. Media content source 802 may also include a remote media server used to store different types of content (including video content selected by a user), in a location remote from any of the client devices. Media content source 802 may also provide metadata that can be used to in analyzing a received query and generating a disambiguating query as described above.

Client devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices (such as, e.g., server 804), which may be located centrally or at distributed locations, that provide cloud-based services to various types of users and devices connected via a network such as the Internet via communication network 806. In such embodiments, user equipment devices may operate in a peer-to-peer manner without communicating with a central server.

Figure 9:
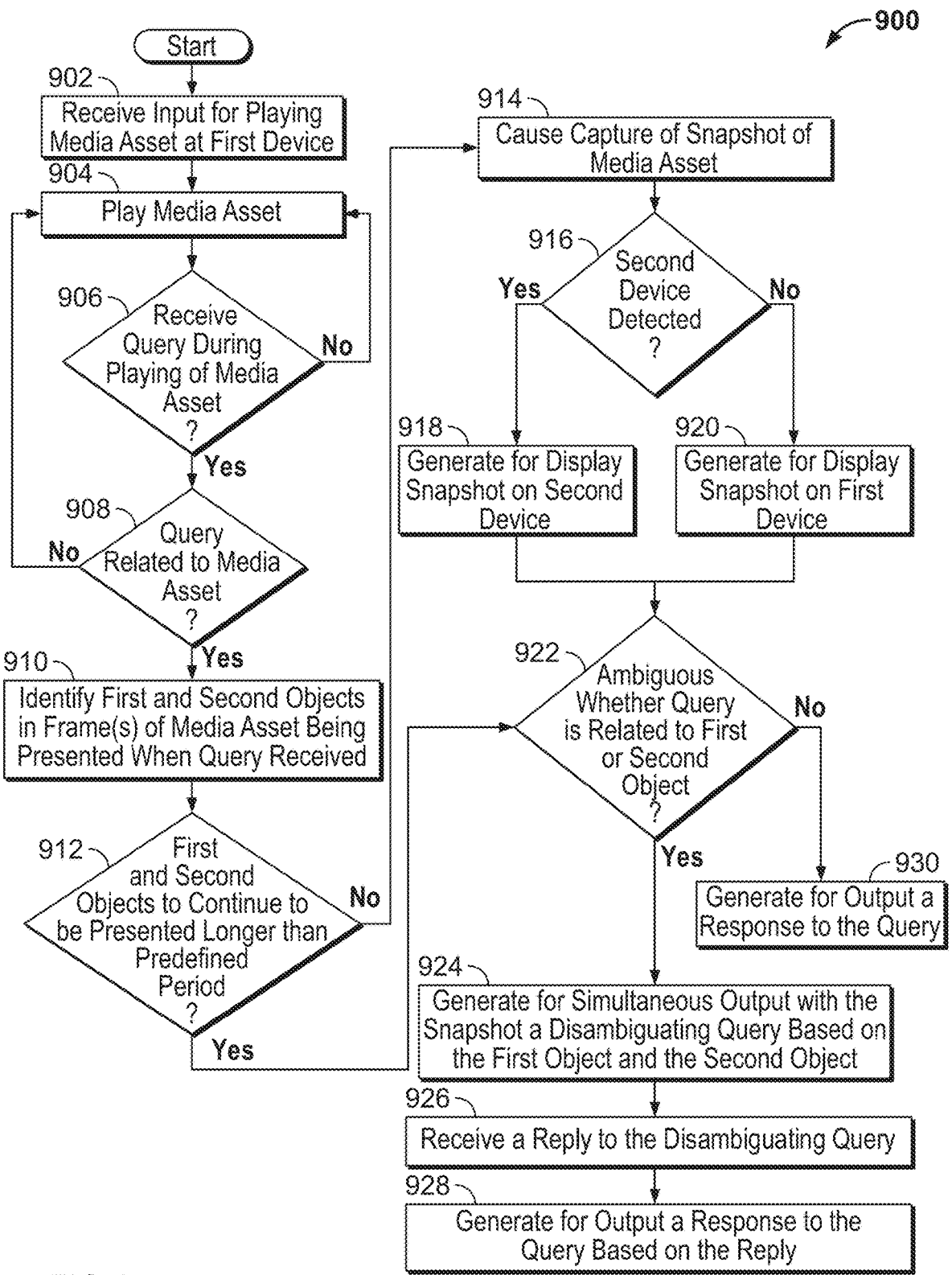
FIG. 9 is a flowchart of a detailed illustrative process for generating a disambiguating query based on a first object and a second object depicted in a media asset, in accordance with some embodiments of this disclosure.

FIG. 9 is a flowchart of a detailed illustrative process for generating a disambiguating query based on a first object and a second object depicted in a media asset, in accordance with some embodiments of this disclosure. In various embodiments, the individual steps of process 900 may be implemented by one or more components of the devices and systems of FIGS. 1-8. Although the present disclosure may describe certain steps of process 900 (and of other processes described herein) as being implemented by certain components of the devices and systems of FIGS. 1-8, this is for purposes of illustration only, and it should be understood that other components of the devices and systems of FIGS. 1-8 may implement those steps instead. For example, the steps of process 900 may be executed at device 809 and/or server 912 of FIG. 8 to perform the steps of process 900.

At 902, control circuitry (e.g., control circuitry 704 of FIG. 7 and/or control circuitry 811 of FIG. 8) may receive input for playing a media asset (e.g., media asset 105 of FIG. 1). In some embodiments, the media asset may be played on user equipment 808 (e.g., a computer) or 810 (e.g., smart TV) in response to a command received from user equipment 809 (e.g., a mobile device running the media application to perform remote control operations).

At 904, control circuitry (e.g., control circuitry 704 of FIG. 7) plays the requested media asset (e.g., media asset 105). In some embodiments, the media asset may be transmitted (e.g., streamed or downloaded) from a media server (e.g., media content source 802 of FIG. 8) and caused to be presented at user equipment (e.g., smart television 106 of FIG. 1).

At 906, control circuitry (e.g., control circuitry 704 of FIG. 7 and/or control circuitry 811 of FIG. 8) monitors whether a query (e.g., query 122) has been receiving while the media asset is being played. If the control circuitry determines that no query has been received, the media asset continues to be presented and the control circuitry continues to wait for such a query. If the control circuitry determines that the query has been received during the playing of the media asset, processing proceeds to 908. The query may be received by the control circuitry in any suitable format (e.g., text, voice, tactile, biometric input, or any combination thereof).

At 908, control circuitry (e.g., control circuitry 704 of FIG. 7 and/or control circuitry 811 of FIG. 8) determines whether the query (e.g., query 122) is related to the media asset (e.g., media asset 105). For example, the control circuitry performs automatic speech recognition and/or NLP processing and/or template-based slot filling to determine an intent and a context of the query, e.g., the control circuitry determines that query 122 of "Who is that actor?" relates to the ongoing media asset being presented by way of the control circuitry, and proceeds to 910. If the control circuitry determines the query does not relate to the media asset (e.g., "What is the weather like today?"), processing returns to 904, e.g., the media asset continues to be played, and the control circuitry optionally may reply to the unrelated query with a suitable response.

At 910, control circuitry (e.g., control circuitry 704 of FIG. 7 and/or control circuitry 811 of FIG. 8) identifies first and second objects in one or more frames of the media asset that is being presented when (or within a predefined period of time of) the query being received. For example, the control circuitry references metadata (e.g., the data shown in FIG. 5) associated with the media asset (e.g., media asset 105) and/or performs image processing techniques to identify a first actor (e.g., actor 102 of FIG. 1, including black shirt 108 and other aspects of the appearance of actor 102) and a second actor (e.g., actor 104 of FIG. 1, including white shirt 114 and other aspects of the appearance of actor 104).

At 912, control circuitry (e.g., control circuitry 704 of FIG. 7 and/or control circuitry 811 of FIG. 8) determines whether the identified first and second objects are to continue being presented longer than a predefined period (e.g., 15 seconds). For example, the control circuitry retrieves metadata associated with an upcoming scene (or otherwise predicts based on a current scene) whether the identified objects will still be depicted in the media asset during such predefined period. If the control circuitry determines the identified objects are not to be present for longer than a predefined period, processing proceeds to 914. Otherwise, processing proceeds to 922.

At 914, control circuitry (e.g., control circuitry 704 of FIG. 7 and/or control circuitry 811 of FIG. 8) causes capture of a snapshot (e.g., snapshot 127 of FIG. 1) of the current frames or segment being presented (e.g., scene 103 of FIG. 1). For example, a snapshot of the current screen may be captured locally, or a remote server (e.g., server 804 of FIG. 8) may transmit a snapshot of the scene at issue.

At 916, control circuitry (e.g., control circuitry 704 of FIG. 7 and/or control circuitry 811 of FIG. 8) determines whether a second device is detected. For example, user equipment 106 of FIG. 1 determines whether user equipment 124 is within a predefined vicinity, and/or on a same local network (e.g., a home Wi-Fi network, a Bluetooth) as user equipment 106 (and optionally, whether user equipment 124 is running the same media application as user equipment 106, to control presentation of media asset 105 on user equipment 106).

At 918, in response to detecting the second device, control circuitry (e.g., control circuitry 704 of FIG. 7 and/or control circuitry 811 of FIG. 8) generates for display the snapshot (e.g., snapshot 127 of FIG. 1) on the second device (e.g., user equipment device 124). For example, user equipment device 106 of FIG. 1 may capture the snapshot and transmit the snapshot to user equipment device 124 for presentation to user 120. On the other hand, at 920, in response to determining that a second device has not been detected, the first device (e.g., user equipment device 206 of FIG. 2) may capture the snapshot (e.g., snapshot 227 of FIG. 2) and pin snapshot 227 to a portion of the display to avoid obstructing the view of the ongoing media asset 205.

At 922, control circuitry (e.g., control circuitry 704 of FIG. 7 and/or control circuitry 811 of FIG. 8) determines whether in the query (e.g., query 122) there is ambiguity as to whether the query is related to the first object or the second object. For example, the control circuitry compares the results of the query analysis performed at 908, which indicated that an intent of the query is to find out more information about an actor, to the results of two actors being identified at 912, and determines that there is ambiguity as to which actor is related to the query. Upon determining the query is ambiguous with respect to the first and second objects, processing proceeds to 924. Otherwise, at 930 the control circuitry provides a response to the query. In some embodiments, the determination at 922 may be performed prior to presenting a snapshot to the user, and the snapshot may optionally not be presented if the query is determined not to be ambiguous with respect to the first and second objects.

At 924, control circuitry (e.g., control circuitry 704 of FIG. 7 and/or control circuitry 811 of FIG. 8) generates for simultaneous output with the snapshot a disambiguating query (e.g., disambiguating query 126) based on the first object and the second object. Techniques for generating the disambiguating query are discussed in more detail in connection with FIG. 10.

At 926, control circuitry (e.g., control circuitry 704 of FIG. 7 and/or control circuitry 811 of FIG. 8) receives a reply (e.g., confirmatory reply 138 of FIG. 1) to the disambiguating query (e.g., query 126 of FIG. 1). In some embodiments, the reply may be received in the form of a text-based input, a voice-based input, or tactile-based input (e.g., prompting the user to select which object he or she intended by the query, and optionally highlighting at least one of the objects, as shown in FIGS. 3A-3C).

At 928, control circuitry (e.g., control circuitry 704 of FIG. 7 and/or control circuitry 811 of FIG. 8) generates for output a response to the query based on the reply. For example, based on the reply (e.g., confirmatory reply 138 of FIG. 1), the control circuitry outputs a response (e.g., response 140 of FIG. 1).

Figure 10:
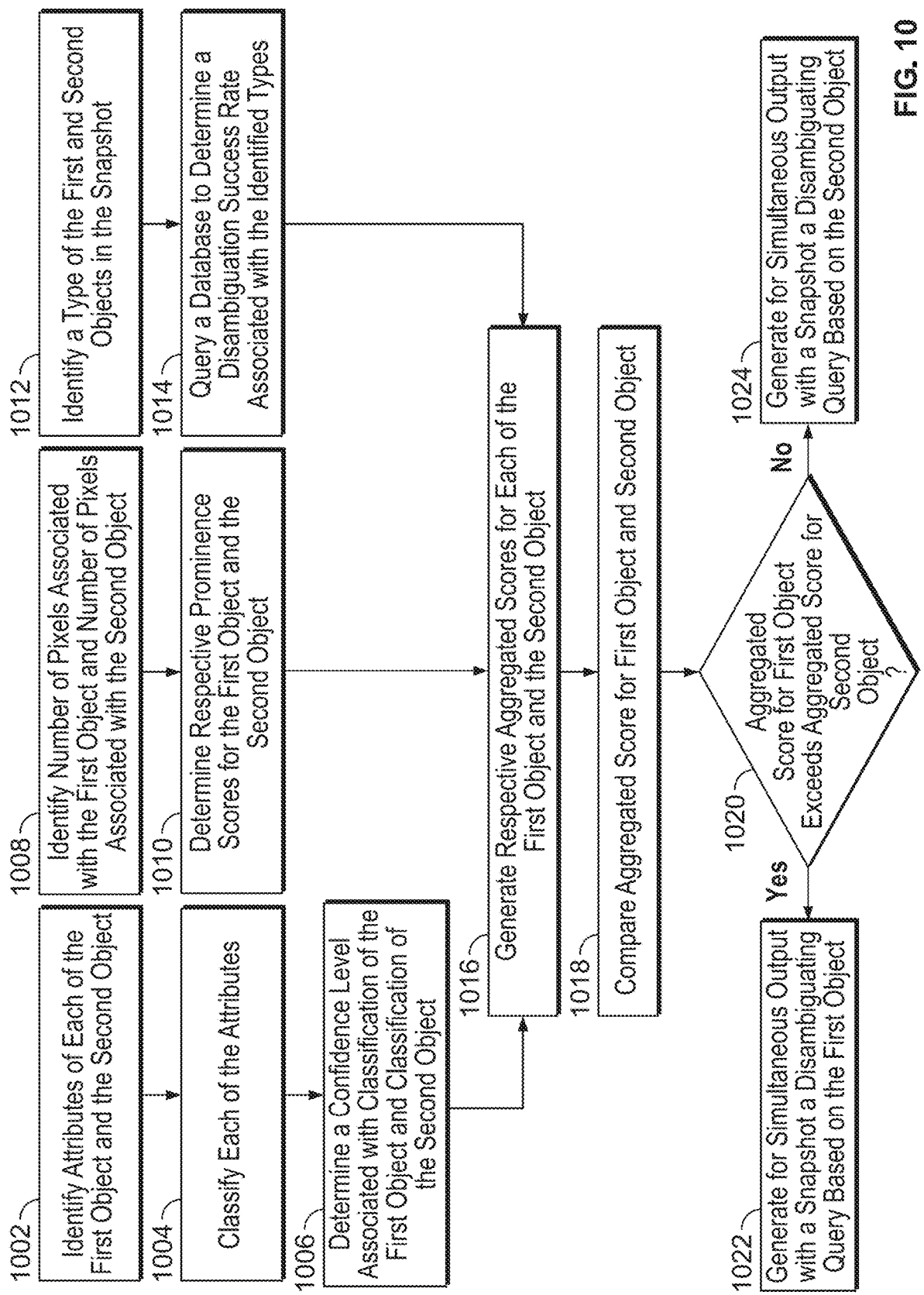
FIG. 10 is a flowchart of a detailed illustrative process for generating a disambiguating query based on a first object and a second object depicted in a media asset, in accordance with some embodiments of this disclosure.

FIG. 10 is a flowchart of a detailed illustrative process for generating a disambiguating query based on a first object and a second object depicted in a media asset, in accordance with some embodiments of this disclosure. In various embodiments, the individual steps of process 1000 may be implemented by one or more components of the devices and systems of FIGS. 1-8. Although the present disclosure may describe certain steps of process 600 (and of other processes described herein) as being implemented by certain components of the devices and systems of FIGS. 1-8, this is for purposes of illustration only, and it should be understood that other components of the devices and systems of FIGS. 1-8 may implement those steps instead. For example, the steps of process 1000 may be executed at device 809 and/or server 812 of FIG. 8 to perform the steps of process 1000.

At 1002, control circuitry (e.g., control circuitry 704 of FIG. 7 and/or control circuitry 811 of FIG. 8) identifies, for the first object (e.g., actor 108 of FIG. 1), attributes (e.g., dynamic attributes such as appearance 504 of FIG. 5, location 506 of FIG. 5, and static attributes such as current media asset 502 and other roles 508), and identifies attributes (e.g., dynamic attributes such as appearance 512 of FIG. 5, location 514 of FIG. 5, and static attributes such as current media asset 510 and other roles 516) for the second object (e.g., actor 114 of FIG. 1). Such attributes may be identified based on metadata associated with the currently playing media asset (e.g., media asset 105 of FIG. 1) and/or image processing techniques of current frames being displayed.

At 1004, control circuitry (e.g., control circuitry 704 of FIG. 7 and/or control circuitry 811 of FIG. 8) classifies each of the attributes (e.g., as shown in FIG. 5, a short sleeve shirt that is black and is made by Armani, white Levi jeans, etc.) for the first object and classifies each of the attributes (e.g., as shown in FIG. 5, a short sleeve shirt which is white and is made by Polo, white Wrangler jeans, etc.).

At 1006, control circuitry (e.g., control circuitry 704 of FIG. 7 and/or control circuitry 811 of FIG. 8) determines a confidence level associated with the classification of the first and second objects. In some embodiments, the confidence level may be based on a percentage of features of the extracted object that match features of an object in the database (e.g., database 805 of FIG. 8), and/or the number of times the candidate object has been identified in the past. In some embodiments, the media application may retrieve information (e.g., from media content source 802 or based on an Internet search) to determine whether the predicted object is likely to be accurate (e.g., to confirm that a particular actor appears in the currently playing media asset). Such confidence levels may be transmitted to a disambiguating query generator (e.g., generator 438 of FIG. 4) for processing at 1016.

At 1008, control circuitry (e.g., control circuitry 704 of FIG. 7 and/or control circuitry 811 of FIG. 8) identifies a number of pixels associated with the first object and number of pixels associated with the second object. For example, the control circuitry may retrieve metadata associated with the particular scene (e.g., scene 103 of FIG. 1) of the media asset (e.g., media asset 105 of FIG. 1) and/or perform edge detection and other image processing techniques to determine boundaries of the objects in the image and compute a total number of pixels occupied by the objects.

At 1010, the control circuitry may determine respective prominence scores for the first object and the second object based on the computed number of pixels. For example, as shown in the example of FIG. 5, the control circuitry may determine an overall prominence score for the appearance of actor 102 of FIG. 1 as 0.8 (0.6 prominence score for black shirt+0.1 prominence score for white jeans and 0.1 prominence score white Prada shoes) as well as prominence scores for each sub-element of appearance 504. Such prominence scores may be transmitted to a disambiguating query generator (e.g., generator 438 of FIG. 4) for processing at 1016.

At 1012, control circuitry (e.g., control circuitry 704 of FIG. 7 and/or control circuitry 811 of FIG. 8) identifies a type of the first and second objects in the snapshot. For example, similar techniques as employed in 1004 may be used to identify a type of object (e.g., a C200 Mercedes-Benz vehicle, as shown in FIG. 6), and at 1014 a database (e.g., database 432 of FIG. 4) may be queried, where the database stores a disambiguation success rate associated with various types of objects. For example, as shown in FIG. 6, a disambiguation success rate associated with a car being in motion may have only a 0.3 success rate (e.g., since there may be multiple moving vehicles in a scene), whereas a disambiguation success rate associated with a particular make and model of Mercedes-Benz C220 may have respective past success rate scores of 0.6 and 0.5 in past queries (in connection with the same scene 107 or other scenes featuring a similar object). Such success rates may be transmitted to a disambiguating query generator (e.g., generator 438 of FIG. 4) for processing at 1016.

At 1016, based on one or more of the confidence levels determined at 1006, the prominence score determined at 1010, and the disambiguation success rate determined at 1014, the control circuitry may generate respective aggregated scores for each of the first object and the second object. In some embodiments, the highest aggregated score (or the highest individual score for a particular category) may be used to determine which object the disambiguating query should focus on. In some embodiments, additional information may be taken into account, e.g., if a user profile indicates the user is interested in cars and thus may be knowledgeable about cars, it may be desirable to provide a disambiguating query related to cars. Additionally or alternatively, while a particular attribute may have a high score, if multiple objects in a scene share this attribute, a more distinctive attribute may be used for the disambiguating query (e.g., the next-highest score associated with a more distinctive attribute). In some embodiments, a distinctiveness score may be computed based on such analysis, or a lack of distinctiveness for a particular object (e.g., three of four actors are wearing a black shirt) may cause one or more of the confidence score, prominence score or disambiguation success rate to be decreased. In some embodiments, one or more of the prominence score, the confidence score and disambiguation success rate may be computed regardless of whether a snapshot is provided.

At 1018, control circuitry (e.g., control circuitry 704 of FIG. 7 and/or control circuitry 811 of FIG. 8) compares the aggregated score for the first object and the second object. The control circuitry may compare any combination of scores for a single attribute or for an object having multiple attributes, to determine an optimal topic for the disambiguating query to focus on.

At 1020, the control circuitry determines whether the aggregated score for first object exceeds the aggregated score for second object. For example, the control circuitry may reference the data structures 500, 501 of FIG. 5 to determine that actor 102 is associated with a higher aggregated score than actor 104, and further that the black shirt of actor 102 is associated with the highest score and thus should be focused on for the disambiguating query.

1022 and 1024 may be performed in a similar manner to 924 of FIG. 9, where the focus of the disambiguating query depends on which object is determined at 1020 to have a higher score in one or more of confidence score, prominence score and disambiguation success rate.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
receiving a query from a user while a media asset is being played on a first device;
in response to determining that the query is related to the media asset:
causing capture of a snapshot of the media asset being played on the first device, wherein the snapshot comprises a depiction of a first object and a second object; and
causing the captured snapshot to be generated for display on a second device;
in response to determining that the query is ambiguous as to whether the query is related to the first object or the second object of the snapshot, generating for simultaneous output with the snapshot a disambiguating query based on the first object and the second object of the snapshot; and
in response to receiving a reply to the disambiguating query, generating for output a response to the query based on the reply.

2. The method of claim 1, wherein generating for output the disambiguating query comprises:
generating for display an overlay highlighting the first object and the second object; and
prompting the user to select either the first object or the second object.

3. The method of claim 1, wherein generating for output the disambiguating query comprises:
modifying the display of the snapshot to zoom in on a portion of the snapshot corresponding to at least one of the first object and the second object; and
prompting the user to select either the first object or the second object.

4. The method of claim 1, wherein causing the capture of the snapshot of the media asset is performed in response to determining that simultaneous display of each of the first object and the second object in the media asset will cease within a predetermined period of time.

5. The method of claim 1, further comprising:
causing the second device to generate for display a graphical user interface comprising selectable options to control the playing of the media asset on the first device,
wherein the simultaneous output of the snapshot and the disambiguating query comprises generating for display the snapshot and the disambiguating query at the graphical user interface of the second device.

6. The method of claim 1, wherein generating for output the disambiguating query comprises:
identifying the first and second objects in the snapshot;
determining at least one attribute associated with each of the first object and the second object; and
generating the disambiguating query based on the attributes of each of the first object and the second object.

7. The method of claim 6, wherein:
the snapshot comprises a plurality of pixels, and
determining the at least one attribute associated with the first object and the second object comprises determining a number of pixels associated with the first object and determining a number of pixels associated with the second object; and
in response to determining the first object is associated with a greater number of pixels than the second object, generating the disambiguating query based on the first object.

8. The method of claim 6, further comprising:
identifying a type of the first and second objects in the snapshot;
querying a database to determine a disambiguation success rate associated with a type of the first object and a disambiguation success rate associated with a type of the second object; and
in response to determining the first object is associated with a type associated with a greater disambiguation success rate than a type of the second object, generating the disambiguating query based on the first object.

9. The method of claim 6, further comprising:
determining a confidence level associated with a classification of the first object;
determining a confidence level associated with a classification of the second object;
in response to determining the first object is associated with a higher classification confidence level than the second object, generating the disambiguating query based on the first object.

10. The method of claim 1, further comprising:
receiving an additional reply, wherein the additional reply is a reply to the response that was generated for output based on the reply to the disambiguating query; and
generating for output an additional disambiguating query based on the additional reply;
wherein generating the disambiguating query comprises:
identifying a plurality of attributes of each of the first object and the second object;
generating a plurality of candidate disambiguating queries based on the first object and the second object; and
selecting as the disambiguating query a candidate disambiguating query of the plurality of candidate disambiguating queries that is likely to disambiguate the query with the fewest number of additional disambiguating queries.

11. A system comprising:
a first device;
a second device; and
control circuitry configured to:
receive a query from a user while a media asset is being played on the first device;
in response to determining that the query is related to the media asset:
cause capture of a snapshot of the media asset being played on the first device, wherein the snapshot comprises a depiction of a first object and a second object; and
cause the captured snapshot to be generated for display on the second device;
in response to determining that the query is ambiguous as to whether the query is related to the first object or the second object of the snapshot, generate for simultaneous output with the snapshot a disambiguating query based on the first object and the second object of the snapshot; and
in response to receiving a reply to the disambiguating query, generate for output a response to the query based on the reply.

12. The system of claim 11, wherein the control circuitry is configured to generate for output the disambiguating query by:
generating for display an overlay highlighting the first object and the second object; and
prompting the user to select either the first object or the second object.

13. The system of claim 11, wherein the control circuitry is configured to generate for output the disambiguating query by:
  modifying display of the snapshot to zoom in on a portion of the snapshot corresponding to at least one of the first object and the second object; and
  prompting the user to select either the first object or the second object.

14. The system of claim 11, wherein control circuitry is configured to cause the capture of the snapshot of the media asset in response to determining that simultaneous display of each of the first object and the second object in the media asset will cease within a predetermined period of time.

15. The system of claim 11, wherein:
  the control circuitry is further configured to cause the second device to generate for display a graphical user interface comprising selectable options to control the playing of the media asset on the first device,
  wherein the control circuitry is configured to perform the generating for simultaneous output of the snapshot and the disambiguating query by generating for display the snapshot and the disambiguating query at the graphical user interface of the second device.

16. The system of claim 11, wherein the control circuitry is configured to generate the disambiguating query by:
  identifying the first and second objects in the snapshot;
  determining at least one attribute associated with each of the first object and the second object; and
  generating the disambiguating query based on the attributes of each of the first object and the second object.

17. The system of claim 16, wherein:
  the snapshot comprises a plurality of pixels, and
  the control circuitry is configured to generate the disambiguating query by:
    determining the at least one attribute associated with the first object and the second object by determining a number of pixels associated with the first object and determining a number of pixels associated with the second object; and
    in response to determining the first object is associated with a greater number of pixels than the second object, generate the disambiguating query based on the first object.

18. The system of claim 16, wherein the control circuitry is configured to generate the disambiguating query by:
  identifying a type of the first and second objects in the snapshot;
  querying a database to determine a disambiguation success rate associated with a type of the first object and a disambiguation success rate associated with a type of the second object; and
  in response to determining the first object is associated with a type associated with a greater disambiguation success rate than a type of the second object, generating the disambiguating query based on the first object.

19. The system of claim 16, wherein the control circuitry is configured to generate the disambiguating query by:
  determining a confidence level associated with a classification of the first object;
  determining a confidence level associated with a classification of the second object;
  in response to determining the first object is associated with a higher classification confidence level than the second object, generating the disambiguating query based on the first object.

20. The system of claim 11, wherein:
  the control circuitry is further configured to
    receive an additional reply, wherein the additional reply is a reply to the response that was generated for output based on the reply to the disambiguating query; and
    generate for output an additional disambiguating query based on the additional reply; and
  the control circuitry is configured to generate the disambiguating query by:
    identifying a plurality of attributes of each of the first object and the second object;
    generating a plurality of candidate disambiguating queries based on the first object and the second object; and
    selecting as the disambiguating query a candidate disambiguating query of the plurality of candidate disambiguating queries that is likely to disambiguate the query with the fewest number of additional disambiguating queries.

* * * * *